Aug. 25, 1953
G. B. HILL
2,649,681
SIDE DELIVERY RAKE
Filed Oct. 11, 1950
2 Sheets-Sheet 1
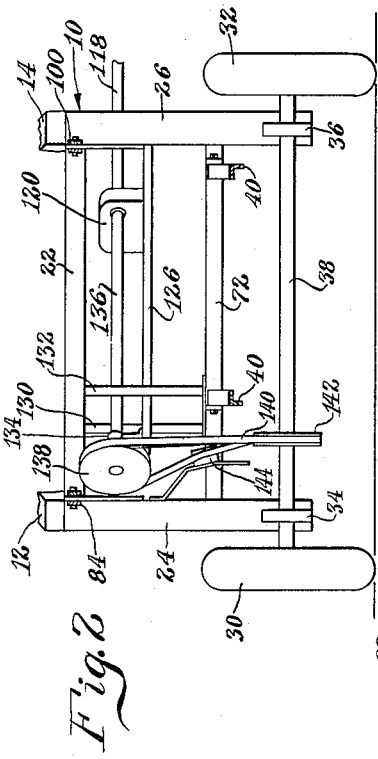
Fig. 4
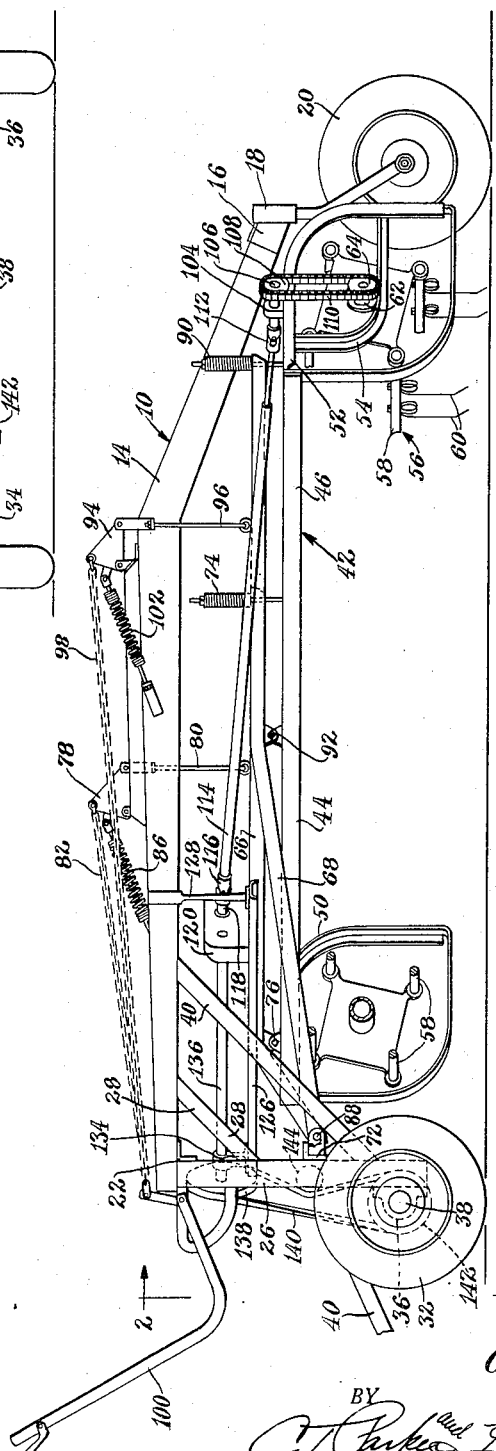
Fig. 2
Fig. 1
INVENTOR.
G. B. Hill
BY
Attorneys Aug. 25, 1953
G. B. HILL
2,649,681
SIDE DELIVERY RAKE
Filed Oct. 11, 1950
2 Sheets-Sheet 2
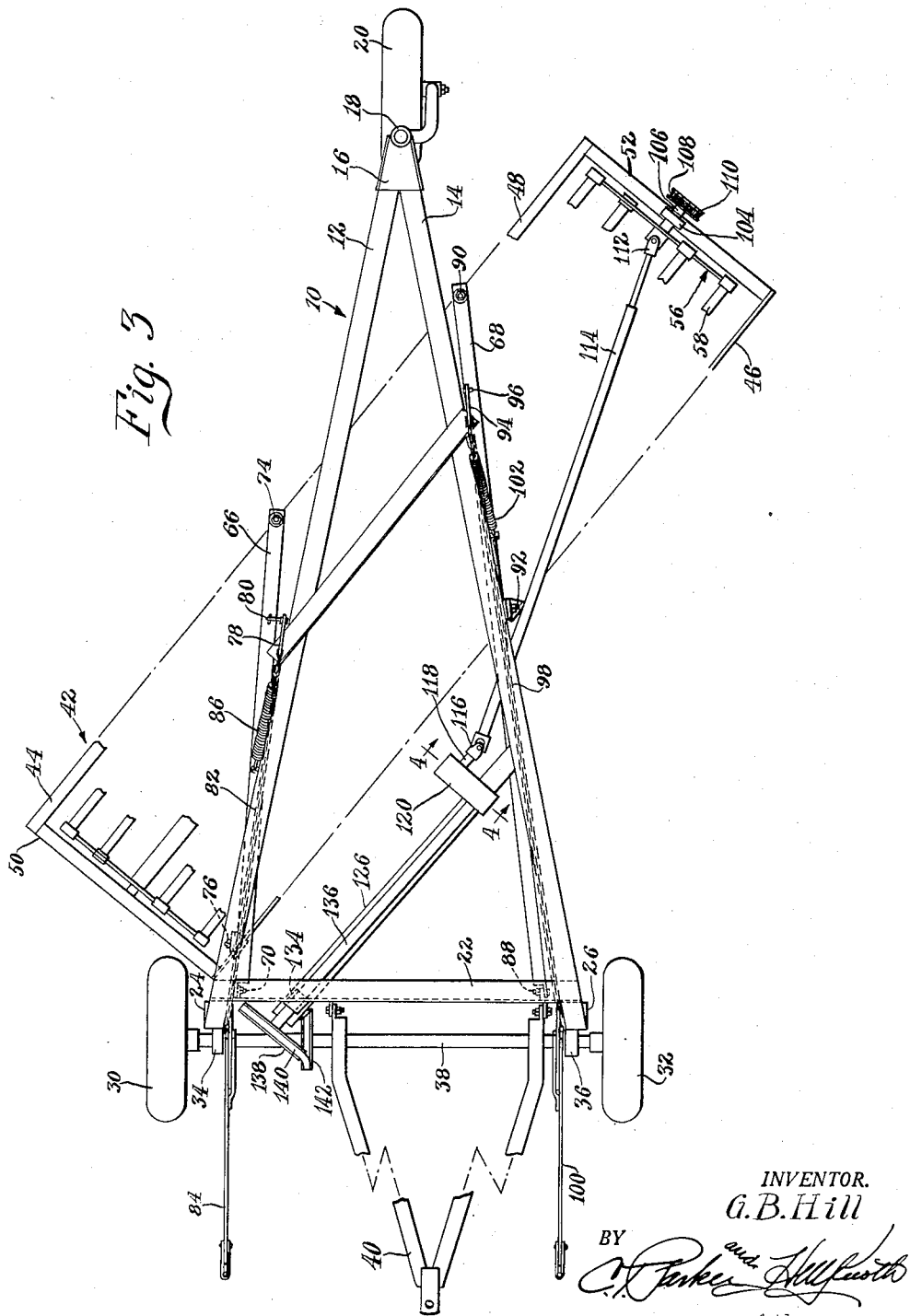
INVENTOR.
G. B. Hill
BY
Attorneys Patented Aug. 25, 1953

2,649,681

UNITED STATES PATENT OFFICE 2,649,681

SIDE DELIVERY RAKE

George B. Hill, New Holland, Pa., assignor to Deere Manufacturing Co., Dubuque, Iowa, a corporation of Iowa Application October 11, 1950, Serial No. 189,650

4 Claims. (Cl. 56—377)

1

This invention relates to a side delivery rake and more particularly to an improved rake structure having a relatively high arched frame and rendered mobile by relatively small, automotive, rubber-tired wheels.

Side delivery rakes of the type heretofore found in the art are characterized by a pair of front wheels of relatively large diameter, the transverse axle on which these wheels are journaled fixing the level of the rearwardly extending rake frame. The rear end of the frame is ordinarily provided with a drop section for the mounting of a bearing in which one or more caster wheels may be carried. The rake is propelled by animals or tractors through the medium of draft means connected to a forward portion of the frame. Inasmuch as the general level of the frame is fixed by the axis of the large front wheels, the frame imposes somewhat of a limitation upon the size and type of rake device that can be used. For example, the frame is relatively low and consequently the rake device or cylinder must be somewhat small. The manner of mounting the rake cylinder is likewise complicated by the inability of the design to lend itself to free floating movement of the raking device or cylinder.

According to the present invention, the height or general level of the frame is considerably higher than in the past, this being made possible by the provision of the frame in the form of a relatively high arch having a drop section or supporting means in the form of a pair of transversely spaced, substantially upright supports at its forward end. The lower ends of these supports carry transverse axle means on which a pair of wheels are journaled. These wheels are relatively small as compared with the old style wheels. As a matter of fact, the conventional automotive, rubber-tired wheels lend themselves well to the improved design. One or more caster wheels may be provided and these may likewise utilize the automotive-type wheel, thus standardizing the size of wheels throughout a given rake design. All the wheels are completely below the general level of the rake frame. Hence, the rake frame does not depend for its position upon being supported directly by a relatively low axle; that is, the height of the frame is determined by the length of the vertical or upright support between the front end of the frame and the front ground wheels.

In prior rakes, it was conventional to drive directly from one of the large front wheels. According to the present invention, the driving

2 means for the rake reel or cylinder is of an improved character, involving primarily an endless chain or belt drive from the front axle means to an input shaft for gear drive means for effecting the transmission of power ultimately through an output member and driving shaft to one end of the rake device. Driving mechanim of this character has many advantages over the direct bevel pinion drive of the art.

The foregoing and other important objects inherent in and encompassed by the invention will become apparent as the disclosure is completely made in the following detailed description and accompanying sheets of drawings.

In the drawings:

Figure 1 is a side elevational view of a side delivery rake, certain portions of conventional parts of the rake being omitted to simplify the disclosure;

Figure 2 is a front elevational view, partly in section as seen along the line 2—2 of Figure 1;

Figure 3 is a top plan view of the rake shown in Figure 1, once again conventional portions of the rake structure being omitted to simplify the disclosure; and Figure 4 is an enlarged sectional view taken substantially on the line 4—4 of Figure 3 and showing part of the power-transmission mechanism.

The implement or rake shown comprises essentially a longitudinal frame structure designated generally by the numeral 10. This structure comprises a pair of generally longitudinally extending frame members 12 and 14, spaced apart laterally at their forward ends and converging at their rear ends to a connection at 16 which includes a bearing 18 for the standard or axle of a caster wheel 20. The particular type and number of caster wheels form no part of the present invention and whether one or more is used is a matter of design.

The laterally spaced apart forward ends of the longitudinal frame members 12 and 14 are rigidly cross connected by a transversely extending frame member 22. The manner of cross connecting the forward ends of the frame members 12 and 14 will be clear from the drawings. The transverse member 22 is preferably in the form of an angle, although it could be a channel or a tube, as desired. The extreme forward ends of the longitudinal members 12 and 14 are rigidly connected, as by welding, respectively to supporting means in the form of a pair of substantially upright supports or legs 24 and 26. The transverse member 22 is rigidly secured, as by welding, at its opposite ends to the upright support. The supports are respectively braced to the longitudinal members by braces 28, only one of which appears in Figure 1. The structure just described provides a rigid construction for the forward end of the frame.

The supports or legs 24 and 26 are of such length as to dispose the general level of the frame 10 at a substantial height above the ground, preferably as shown. The frame structure as viewed from the side is arched and the length of the supports 24 and 26 is such as to dispose the lower ends thereof generally in the horizontal plane of the rotating axis of the caster wheel 20. Therefore, the forward end of the rake may be carried by a pair of wheels 30 and 32 of the same size as the caster wheel 20. Preferably, all wheels are of the automotive, rubber-tired type. The wheels 30 and 32 sustain the front end of the rake frame through the medium of bearings 34 and 36 and axle means comprising a single transverse axle 38. The extreme lower ends of the legs 24 and 26 are additionally braced to the longitudinal members 12 and 14 by braces 40, only one of which appears in Figure 1.

Because of the arched construction of the frame structure 10 and its disposition at the substantial height as illustrated, the design lends itself readily to the provision of adequate means for pivotally suspending a raking device such as a rake cylinder or reel intermediate the front and rear ground wheels and angularly or diagonally disposed relative to the line of draft or line of travel of the frame. The rake illustrated is of the type adapted to be drawn by a tractor and for that purpose has a forwardly extending hitch device represented generally by the numeral 40. However, the rake may be propelled otherwise.

The rake device is designated generally by the numeral 42 and comprises a substantially rectangular frame 44 as viewed from above. This frame has a forward elongated frame member 46 and a rear or trailing member 48, together with opposite end frame members 50 and 52. By means of suitable supporting means including bearings, such as represented generally in Figure 1 and designated by the numeral 54, the rake frame carries a rotatable reel or cylinder 56 including rake bars 58 and tines 60. The type of reel illustrated is generally conventional and the details have not been completely developed, since these details form no part of the present invention. The reel is rotated from its left-hand or rear end by means of a central shaft 62 to which is keyed a sprocket 64.

The suspension of the reel frame 42 is accomplished by means of a pair of rearwardly extending suspension members 66 and 68. As will appear from Figures 1 and 3, the suspension member 66 is somewhat shorter than the member 68. The former is pivoted at 70 at its forward end to a transverse member 72 cross connected between intermediate portions of the upright supports or legs 24 and 26. This member 66 extends upwardly and rearwardly over the rake frame 44 and has a resilient suspension connection 74 with an intermediate portion of the rear frame member 48 of the rake frame 44.

The right-hand forward end portion of the front frame member 46 of the rake frame is pivotally connected at 76 to a forward portion of the suspension member 66. The member 66 is itself adjustably suspended from the main frame structure 10 by means of a bell crank 78, link 80, adjusting member in the form of a chain 82 and an adjustable hand lever 84. An assist spring 86 is connected between the bell crank 78 and a portion of the main frame 10.

The general structure and function of the suspension member 68 are similar to those described in connection with the member 66. The member 68 is pivoted at its forward end at 88 to the left-hand end of the lower transverse member 72 adjacent the left-hand upright support 26. This member extends rearwardly and upwardly and then horizontally to overlie the rake frame 44. The rear end of the member 68 operates through resilient suspension means 90 to carry the rear or left-hand end portion of the rake frame 44. The forward frame member 46 of the rake frame is pivotally connected at 92 to an intermediate portion of the suspension member 68. The pivots 76 and 92 are alined on an axis parallel to the diagonal axis of the rotatable reel 56. The suspension means 74 and 90, being connected to the rear frame member 48 of the rake frame, are likewise alined diagonally.

The suspension member 68 is adjustably suspended from the main frame 10 by means of a bell crank 94, link 96, adjusting chain 98, and an adjusting hand lever 100. An assist spring 102 is connected between the bell crank 94 and an intermediate portion of the main frame 10. By means of adjustment of the hand levers 84 and 100, or either of them, the general level of the rake frame 44 may be selectively adjusted to accommodate varying ground conditions. In the event of uneven terrain, the rake may rise and fall because of the resilient suspensions at 74 and 90 and further may have upward movement because of the flexible connections at 82 and 98 with the lifting mechanism. The general level of the frame 10 is at such height as to permit relatively free floating movement of the rake frame and its associated raking device.

It is another feature of the invention to provide improved driving means for rotating the rake device or cylinder. As previously stated, the cylinder includes a driven shaft 62 on which is keyed the sprocket 64. The upper portion of the left-hand end of the frame member 52 of the rake frame carries a bearing 104 in which is journaled a short shaft 106 carrying a sprocket 108. Power-transmitting means, here in the form of an endless chain 110, connects the sprockets 108 and 64.

The inner end of the shaft 106 is connected by a universal joint 112 to an elongated, power-transmitting member in the form of a telescoping shaft 114, the forward end of which is connected by a universal joint 116 to an output shaft 118 extending from a gear box 120 which forms part of gear-drive, power-transmitting means to be presently described.

As best shown in Figure 4, the gear box 120 carries a pair of gears 122 and 124. The gear 122 is keyed to the shaft 118 and the gears are in constant mesh. The gear box 120 is carried by the frame structure through means comprising a substantially transverse or rearwardly inclined member 126 suspended at one end by a bracket 128 (Figure 1) from the left-hand longitudinal frame member 14 and at its other end by a pair of vertical members 130 and 132 (Figure 2) rigidly supported between the upper and lower front transverse members 22 and 72. The forward or right-hand end of the member 126 has a bearing 134 for journaling one end of a power-transmitting member in the form of a relatively elongated input shaft 136. The other end of the shaft 136 enters the gear box 120 and is keyed to the gear 124. Thus, power transmission is established between the shaft 136, via the gearing 122—124, to the rake device or cylinder.

The extreme forward end of the shaft 136 has keyed thereto a driving member, here shown as a sheave 138. A flexible drive-transmitting element in the form of a belt 140 is trained about the sheave 138 and about a second driving member in the form of a sheave 142 keyed to the front wheel axle means 38 intermediate the front supports 24 and 26. Because of the disposition of the sheaves 138 and 142 in angularly related planes, an appropriately positioned idler 144 (Figures 1 and 2) is provided. Forward travel of the rake, whether drawn by a tractor or by animals, effects rotation of the reel through the power-transmitting mechanism described.

Various other features and advantages of the invention not specifically enumerated herein will undoubtedly occur to those versed in the art, as likewise will numerous modifications and alterations of the preferred embodiment of the invention illustrated, all of which may be achieved without departing from the spirit and scope of the invention as defined in the appended claims.

What is claimed is:

1. In combination, a side delivery rake having a frame structure, a rotatable rake cylinder pivotally suspended from said frame structure, rear ground wheel means supporting said frame structure, laterally spaced depending axle supports rigidly connected to the forward end of said frame structure, and forward ground wheels journaled on said axle supports, said supports extending downwardly in a substantially transverse vertical plane below said frame whereby said forward ground wheels are positioned completely below said frame structure.

2. In combination, a side delivery rake having an overhanging frame structure, a rear ground wheel means supporting one end of said frame structure, a rotatable rake cylinder pivotally suspended from said frame structure, a transversely extending frame member connected to the forward end of said frame structure, downwardly extending laterally spaced axle supports, said supports extending substantially below said frame member in a substantially transverse vertical plane, and front ground wheels rotatably connected to said axle supports, said ground wheels being positioned below said transversely extending frame member.

3. A side delivery rake, comprising: a frame structure, including laterally spaced longitudinal frame members; rear ground wheel means connected to said frame structure; a rotatable rake cylinder, pivotally suspended from said frame structure; a substantially transverse member connecting the forward ends of said longitudinal frame members; laterally spaced depending axle supports, associated with the transverse member and extending substantially below said frame structure in a substantially transverse vertical plane; axle means connected to said axle supports; forward ground wheels journaled on said axle means; and means for rotating said rake cylinder, including a shaft, rotatably supported by said transverse member, drive means for rotating said shaft from said front ground wheels, said drive means including an endless flexible element, and transmission means connecting said rotating shaft and said rake cylinder for rotating the same.

4. A side delivery rake, comprising: a frame structure, including laterally spaced, longitudinally extending frame members; ground wheel means connected to the rear of said frame structure; a rotatable rake cylinder, pivotally suspended from said frame structure and disposed angularly relative to the line of draft; a substantially transversely extending frame member connecting the forward ends of said longitudinally extending frame members; laterally spaced depending axle supports, associated with and projecting below the transversely extending member; axle means, connected to the supports and disposed in a vertical plane with said transversely extending member; forward ground wheels rotatably mounted on said axle means, said wheels being positioned entirely below said transversely extending frame member; and means for rotating said rake cylinder, including a shaft, journaled on said transversely extending frame member, a driving mechanism connecting said forward ground wheels and said shaft for rotating the same, said driving mechanism including a chain power transmission mechanism carried by said transversely extending frame member, said power transmission mechanism including gear drive mechanism arranged to be driven by said rotatable shaft, and drive means operatively connecting said transmission mechanism and said rotatable cylinder for rotating the same.

GEORGE B. HILL.

References Cited in the file of this patent

UNITED STATES PATENTS

| Number | Name | Date |
|---|---|---|
| 1,283,474 | Dain | Nov. 5, 1918 |
| 2,403,401 | Rietz | July 2, 1946 |
| 2,511,894 | Altgelt | June 20, 1950 |
| 2,518,389 | Sisulak | Aug. 8, 1950 |
| 2,597,828 | Spurlin | May 20, 1952 |